United States Patent
Furui et al.

(10) Patent No.: US 10,349,024 B2
(45) Date of Patent: Jul. 9, 2019

(54) IMAGE PROCESSING DEVICE, IMAGE PROCESSING METHOD, AND DISPLAY DEVICE

(71) Applicant: SEIKO EPSON CORPORATION, Tokyo (JP)

(72) Inventors: Shiki Furui, Matsumoto (JP); Manabu Saigo, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/554,609

(22) PCT Filed: Feb. 5, 2016

(86) PCT No.: PCT/JP2016/000619
§ 371 (c)(1),
(2) Date: Aug. 30, 2017

(87) PCT Pub. No.: WO2016/139889
PCT Pub. Date: Sep. 9, 2016

(65) Prior Publication Data
US 2018/0241977 A1    Aug. 23, 2018

(30) Foreign Application Priority Data
Mar. 2, 2015    (JP) .................................. 2015-040493

(51) Int. Cl.
*G06T 1/60*    (2006.01)
*H04N 9/31*    (2006.01)
*H04N 9/79*    (2006.01)

(52) U.S. Cl.
CPC ............. *H04N 9/3185* (2013.01); *G06T 1/60* (2013.01); *H04N 9/7904* (2013.01)

(58) Field of Classification Search
CPC combination set(s) only.
See application file for complete search history.

(56) References Cited

U.S. PATENT DOCUMENTS 6,367,933 B1 *    4/2002    Chen .................... H04N 3/2335
                                                         348/744
7,499,202 B2 *    3/2009    Ono ..................... H04N 1/6033
                                                         358/1.9

(Continued)

FOREIGN PATENT DOCUMENTS

JP        2011-188051 A    9/2011

OTHER PUBLICATIONS

Apr. 19, 2016 International Search Report issued in International Patent Application No. PCT/JP2016/000619.

*Primary Examiner* — Tsung Yin Tsai
(74) *Attorney, Agent, or Firm* — Oliff PLC (57)    ABSTRACT

An image processing device includes: an acquisition unit which successively acquires a gradation value of a target pixel specified in a predetermined order, from image data of an input image; a first computing unit which computes coordinates of the target pixel in an output image; a second computing unit which computes a gradation value at the coordinates, based on the gradation value of the target pixel; an internal storage unit which stores, block by block, each block being formed by dividing a plurality of pixels included in the output image, gradation values of the plurality of pixels; a first writing unit which writes the gradation value computed by the second computing unit into a storage area corresponding to the coordinates; and a second writing unit which writes data of a block where the writing of the gradation value is complete, into an external memory.

4 Claims, 8 Drawing Sheets

(56) References Cited

U.S. PATENT DOCUMENTS

| | | | |
|---|---|---|---|
| 7,733,407 B2 * | 6/2010 | Furukawa | G06T 3/0018 348/335 |
| 9,224,321 B2 * | 12/2015 | Tamura | G09G 5/00 |
| 2004/0105596 A1 * | 6/2004 | Inoue | G09G 5/00 382/274 |
| 2009/0238490 A1 * | 9/2009 | Tamura | G09G 5/393 382/275 |
| 2009/0305718 A1 * | 12/2009 | Cho | G06T 9/005 455/456.1 |
| 2010/0021080 A1 * | 1/2010 | Tamura | H04N 9/3185 382/275 |
| 2011/0216983 A1 | 9/2011 | Tamura et al. | |
| 2015/0348516 A1 * | 12/2015 | Hayashi | G09G 3/002 345/545 |

\* cited by examiner

IMAGE PROCESSING DEVICE, IMAGE PROCESSING METHOD, AND DISPLAY DEVICE

CROSS-REFERENCE

The entire disclosure of Japanese Patent Application No. 2015-040493, filed Mar. 2, 2015 is expressly incorporated by reference herein.

BACKGROUND

1. Technical Field

The present invention relates to geometric correction.

2. Background Art

A technique in which an input image is transformed into an arbitrary shape to obtain an output image is known. JP-A-2011-188051 discloses that, in a projector which carries out, on each block video data, correction processing to correct a distortion of a video projected on a projection surface, a block video necessary for pixel interpolation is predicted and stored in a block video storage unit, thereby reducing the time taken to read out and store a necessary block video anew at the time of carrying out pixel interpolation and thus achieving an increase in the speed of keystone correction processing.

In the technique disclosed in JP-A-2011-188051, pixel values of a video before correction are scanned obliquely to the direction of lines in order to specify pixel values of the video after correction, pixel by pixel in the direction of lines. Therefore, the technique disclosed in PTL 1 has a problem that a frame buffer for temporarily storing the video before correction is essential. There is also a problem that the access efficiency of the frame buffer drops due to the oblique scanning of the video before correction.

SUMMARY

To cope with these, an object of the invention is to reduce the processing loads at the time of converting an input image to an output image.

The invention provides an image processing device including: an acquisition unit which successively acquires a gradation value of a target pixel specified in a predetermined order, from image data of an input image including gradation values of a plurality of pixels; a first computing unit which computes coordinates of the target pixel in an output image; a second computing unit which computes a gradation value at the coordinates computed by the first computing unit, based on the gradation value of the target pixel; an internal storage unit having a storage area where, block by block, each block being formed by dividing a plurality of pixels included in the output image, gradation values of the plurality of pixels are stored; a first writing unit which writes the gradation value computed by the second computing unit into a storage area corresponding to the coordinates computed by the first computing unit, in the internal storage unit; and a second writing unit which writes data of a block where the writing of the gradation value is complete in the internal storage unit, into an external memory.

With this image processing device, the processing load at the time of converting an input image to an output image is reduced, compared with the case where the gradation value of a target pixel is not specified in a predetermined order from image data of an input image.

In another preferable embodiment, a length in a direction in which the external memory is scanned, of an area corresponding to the block in the external memory, may be longer than a length in a direction perpendicular to that direction.

With this image processing device, the capacity of a buffer required when data is read out from the external memory can be reduced, compared with the case where the length in which the external memory is scanned, of the area corresponding to the block in the external memory, is equal to or shorter than the length in the direction perpendicular to that direction.

In another preferable embodiment, the second writing unit may write the data in a compressed form into the external memory, and the internal storage unit may control the storage area in such a way that the number of pixels per block increases if a compression rate of the data rises.

With this image processing device, the access efficiency when the data is written into the external memory is increased, compared with the case where the number of pixels per block in the storage area is constant regardless of the compression rate of the data.

In another preferable embodiment, a frame buffer may not be provided at a stage preceding the acquisition unit.

With this image processing device, a frame buffer can be saved.

The invention also provides an image processing method including: successively acquiring a gradation value of a target pixel specified in a predetermined order, from image data of an input image including gradation values of a plurality of pixels; computing coordinates of the target pixel in an output image; computing a gradation value at the computed coordinates, based on the gradation value of the target pixel; writing the computed gradation value into a storage area corresponding to the computed coordinates, of a storage area where, block by block, each block being formed by dividing a plurality of pixels included in the output image, gradation values of the plurality of pixels are stored; and writing data of a block where the writing of the gradation value is complete in the storage area, into an external memory.

With this image processing method, the processing load at the time of converting an input image to an output image is reduced, compared with the case where the gradation value of a target pixel is not specified in a predetermined order from image data of an input image.

The invention also provides a display device having the foregoing image processing device.

With this display device, the processing load at the time of converting an input image to an output image is reduced, compared with the case where the gradation value of a target pixel is not specified in a predetermined order from image data of an input image.

DESCRIPTION OF EXEMPLARY EMBODIMENTS

1. Configuration

Figure 1:
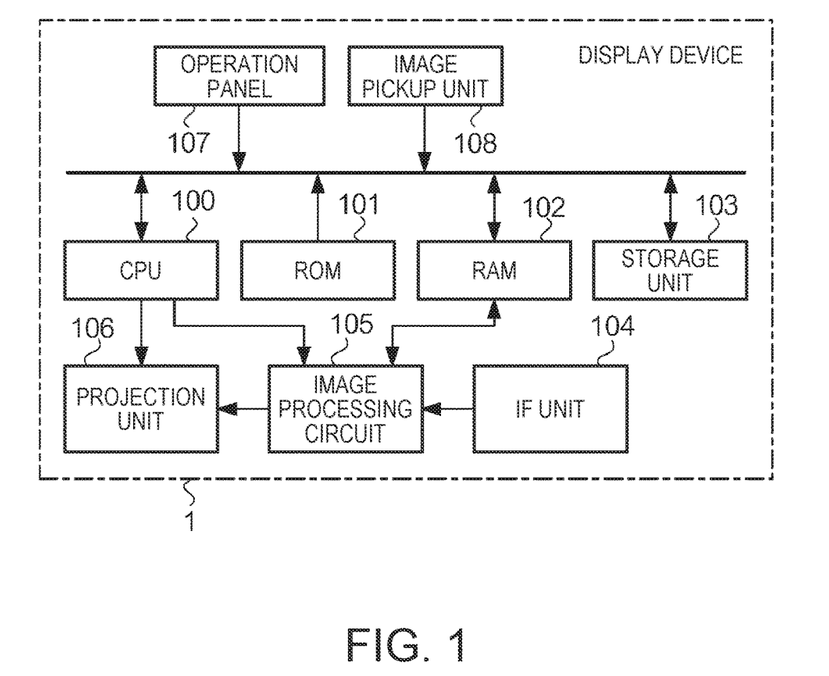
FIG. 1 is a view illustrating the hardware configuration of a display device according to an embodiment.

FIG. 1 is a view illustrating the hardware configuration of a display device 1 according to an embodiment. In this example, the display device 1 is a projector. The display device 1 has a CPU (central processing unit) 100, a ROM (read only memory) 101, a RAM (random access memory) 102, a storage unit 103, an IF (interface) unit 104, an image processing circuit 105, a projection unit 106, an operation panel 107, and an image pickup unit 108.

The CPU 100 is a control device which controls each part of the display device 1. The ROM 101 is a non-volatile storage device in which various programs and data are stored. The RAM 102 is a volatile storage device which stores data, and functions as a work area when the CPU 100 executes processing. The RAM 102 has a frame buffer which stores an image, frame by frame. The storage unit 103 is a non-volatile storage device which stores data and programs, for example, an SSD (solid state drive).

The IF unit 104 is an interface which mediates the communication of signals or data with an external device serving as a video source. The IF unit 104 has a terminal (for example, VGA terminal, USB terminal, wired LAN interface, S terminal, RCA terminal, HDMI (High-Definition Multimedia Interface, trademark registered) terminal or the like) and a wireless LAN interface, for communicating signals or data with the external device.

The image processing circuit 105 is an image processing device which performs predetermined image processing on an inputted video signal (hereinafter referred to as an "input video signal"). For example, geometric correction is included in this image processing. Geometric correction is a correction to change the shape of an image. If the projection axis of the display device 1 is tilted from an ideal state to a projection surface (screen), or if the screen is not flat, an image projected on the screen is distorted. Geometric correction is carried out, for example, to correct this distortion. In addition to this, the image processing by the image processing circuit 105 may also include processing such as size change. The image processing circuit 105 writes image data after image processing, into the frame buffer. The image processing circuit 105 outputs the image data written in the frame buffer to the projection unit 106.

The projection unit 106 projects an image onto the screen, according to the video signal on which the image processing is performed. The projection unit 106 has a light source, a light modulator, an optical system, and drive circuits for these (none of which is illustrated). The light source includes a lamp such as a high-pressure mercury lamp, halogen lamp or metal halide lamp, or a solid-state light source such as an LED (light emitting diode) or laser diode. The light modulator is a device which modulates the light emitted from the light source, according to a video signal, and for example, includes a liquid crystal panel. The optical system is an element which projects the light modulated by the light modulator onto the screen, and for example, includes a lens and a prism. In this example, the light modulator is provided for each color component. Specifically, separate light modulators are provided for the primary colors of red, green and blue, respectively. The light modulated by each liquid crystal panel is combined by the optical system and projected onto the screen.

The operation panel 107 is an input device for a user to input an instruction to the display device 1, and for example, includes a keypad, a button, or a touch panel. The image pickup unit 108 picks up an image of the screen where an image is projected by the projection unit 106.

Figure 2:
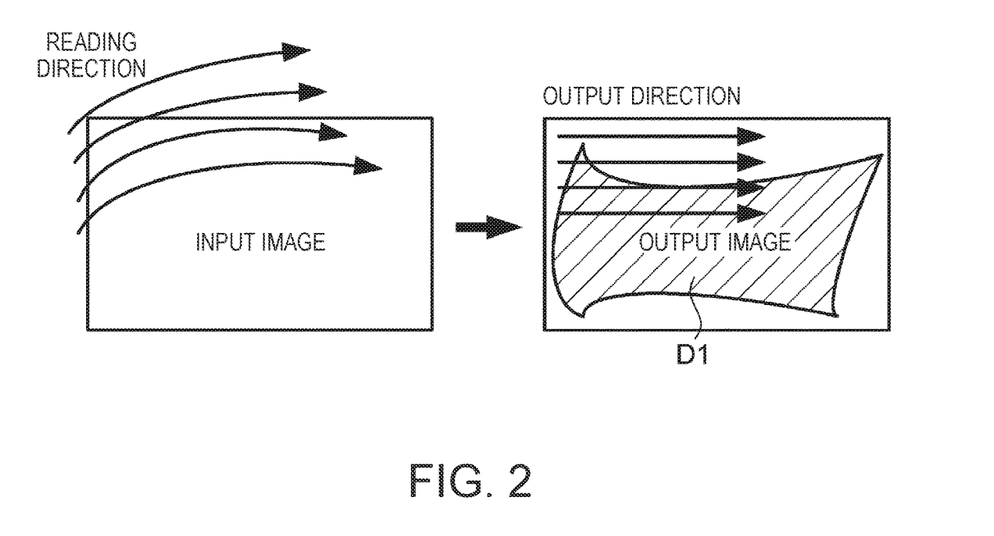
FIG. 2 is a view showing an outline of geometric correction according to a comparative example.

FIG. 2 is a view showing an outline of geometric correction according to a comparative example. In FIG. 2, the image on the left-hand side shows an image before geometric correction is carried out (hereinafter referred to as an "input image"), and the image on the right-hand side shows an image after geometric correction is carried out (hereinafter referred to as an "output image"). In FIG. 2, an area D1 shaded with slant lines in the output image corresponds to the input image. In this example, the image processing circuit 105 successively specifies the gradation values of pixels in the output image in a predetermined direction (in FIG. 2, from the top left to the bottom right). Specifically, first, a pixel to be a target of gradation value specification (here referred to as a "target pixel") in the output image is specified. Next, the pixel position in the input image corresponding to the target pixel is calculated. Data of the pixel corresponding to the calculated pixel position is readout. Using this data, the gradation value of the target pixel is decided. It results in that the image processing circuit 105 scans the input image in an unspecified direction.

Figure 3:
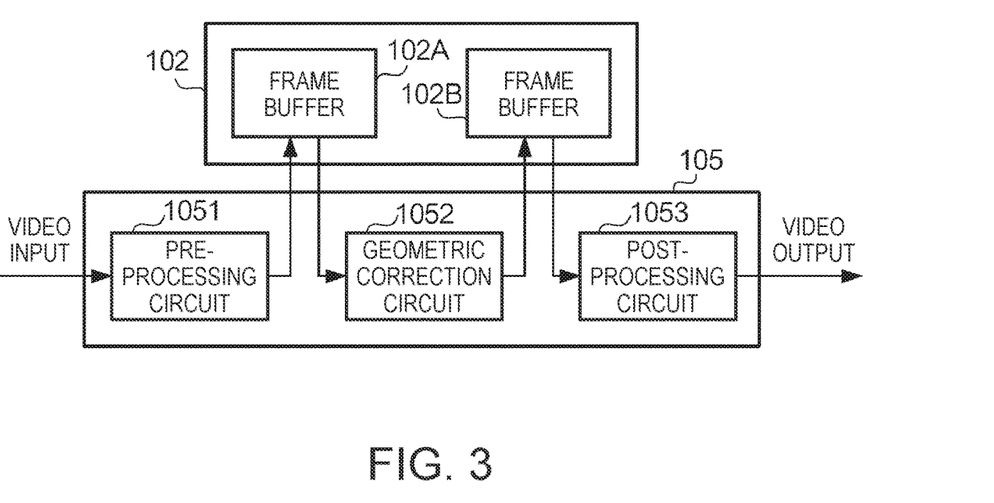
FIG. 3 is a hardware configuration for realizing the geometric correction according the comparative example.

FIG. 3 is a block diagram showing a hardware configuration to realize the geometric correction according to the comparative example. In this example, the image processing circuit 105 includes a pre-processing circuit 1051, a geometric correction circuit 1052, and a post-processing circuit 1053. Meanwhile, the RAM 102 includes a frame buffer 102A and a frame buffer 102B. The pre-processing circuit 1051 is a circuit at the stage preceding the geometric correction circuit 1052 and carries out predetermined image processing such as size change of the input image. The pre-processing circuit 1051 writes the image data after image processing, into the frame buffer 102A. The geometric correction circuit 1052 is a circuit which carries out geometric correction. The geometric correction circuit 1052 calculates the pixel position in the input image corresponding to the target pixel and reads out data of the pixel corresponding to the calculated pixel position from the frame buffer 102A. Moreover, the geometric correction circuit 1052 calculates the gradation value of the target pixel using the read-out data and writes the calculated gradation value into the storage area corresponding to the target pixel in the frame buffer 102B. The post-processing circuit 1053 is a circuit at the stage subsequent to the geometric correction circuit 1052, and reads out image data from the frame buffer 102B at a predetermined dot clock rate and outputs the image data to the projection unit 106.

In the case where geometric correction is carried out by the foregoing method, since the geometric correction circuit 1052 scans, in an unspecified direction, the image data written in the frame buffer 102A, there is a problem that the frame buffer 102A at the stage preceding the geometric correction circuit 1052 is essential and that the access efficiency of the frame buffer 102A drops. Moreover, since the image data of the input image is scanned in an unspecified direction, there is also a problem that the control circuit in the geometric correction circuit 1052 becomes complex. The image processing circuit 105 according to the invention copes with such problems by scanning the image data of the input image in a predetermined direction when carrying out geometric correction.

Figure 4:
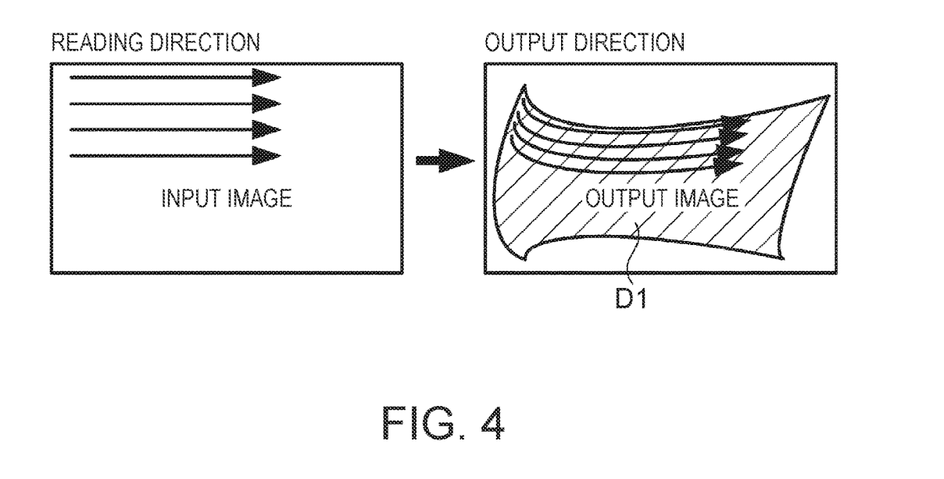
FIG. 4 is a view showing an outline of geometric correction according to the embodiment.

FIG. 4 is a view showing an outline of the geometric correction according to the embodiment. In this example, the image processing circuit 105 (an example of the image processing device) specifies a pixel to be a target of processing in an input image (hereinafter referred to as a "target pixel") in a predetermined order (for example, pixel by pixel in order from the top left to the bottom right). The image processing circuit 105 calculates the pixel position corresponding to the target pixel, in an output image. The image processing circuit 105 writes data of the target pixel into the storage area corresponding to the calculated pixel position, in the frame buffer 102B.

Figure 5:
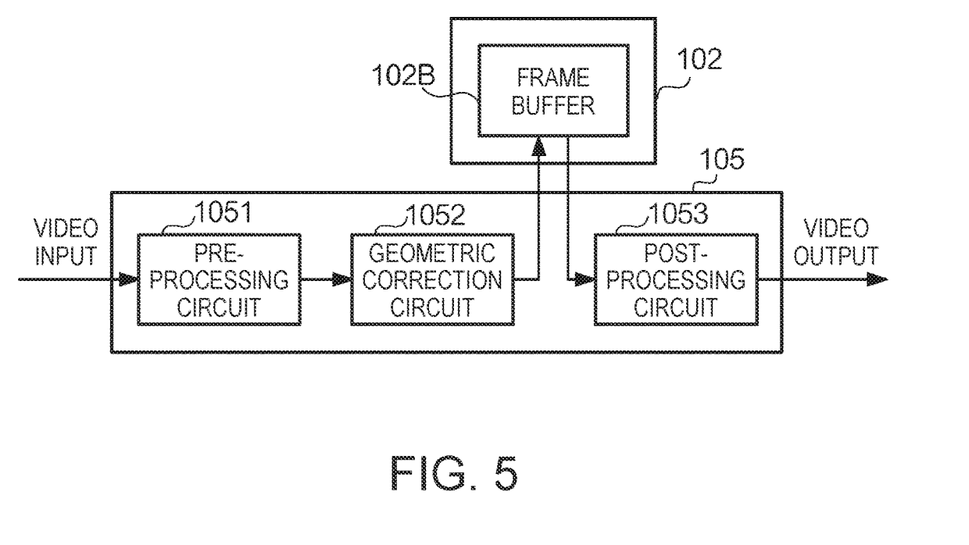
FIG. 5 is the hardware configuration of an image processing circuit according to the embodiment.

FIG. 5 is a block diagram showing the hardware configuration of the image processing circuit 105 according to the embodiment. FIG. 5 is different from the configuration shown in FIG. 3 in that the frame buffer 102A is not provided at the stage preceding the geometric correction circuit 1052. In FIG. 4, the pre-processing circuit 1051 outputs the image data after image processing to the geometric correction circuit 1052. The geometric correction circuit 1052 carries out geometric correction on the image outputted from the pre-processing circuit 1051 and writes the image after geometric correction into the frame buffer 102B.

Figure 6:
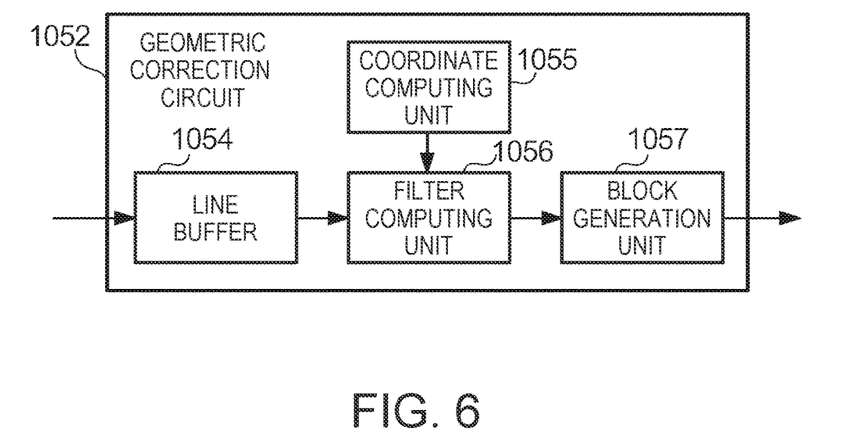
FIG. 6 is a block diagram showing a functional configuration of a geometric correction circuit.

FIG. 6 is a block diagram showing a functional configuration of the geometric correction circuit 1052. The geometric correction circuit 1052 includes a line buffer 1054, a coordinate computing unit 1055, a filter computing unit 1056, and a block generation unit 1057. In the line buffer 1054, the image data of the input image outputted from the pre-processing circuit 1051 is written, for one line or for a plurality of lines. The coordinate computing unit 1055 calculates the pixel position (coordinates) in the output image, corresponding to the target pixel in the input image. The filter computing unit 1056 reads out the gradation value of the target pixel from the line buffer 1054 and computes the gradation value at the coordinates calculated by the coordinate computing unit 1055.

The block generation unit 1057 writes the image data of the output image into the frame buffer 102B. In the output image, target pixels tend to be often arrayed obliquely to the direction of rows and the direction of columns. Therefore, the access efficiency of the frame buffer 102B tends to drop if the writing of the gradation value into the frame buffer 102B is carried out pixel by pixel. The block generation unit 1057 carries out the writing of the image data into the frame buffer 102B, block by block, in order to prevent the reduction in the access efficiency of the frame buffer 102B. The term "block" in this case refers to each area in the case where the output image is spatially divided into a plurality of areas. Specifically, the block generation unit 1057 has a storage area for storing the gradation value of the output image, block by block. The block generation unit 1057 writes the gradation value computed by the filter computing unit 1056, into the block corresponding to the coordinates computed by the coordinate computing unit 1055. The block generation unit 1057 writes the image data in a block where the writing of the gradation value is complete, into the frame buffer 102B.

2. Operation

Figure 7:
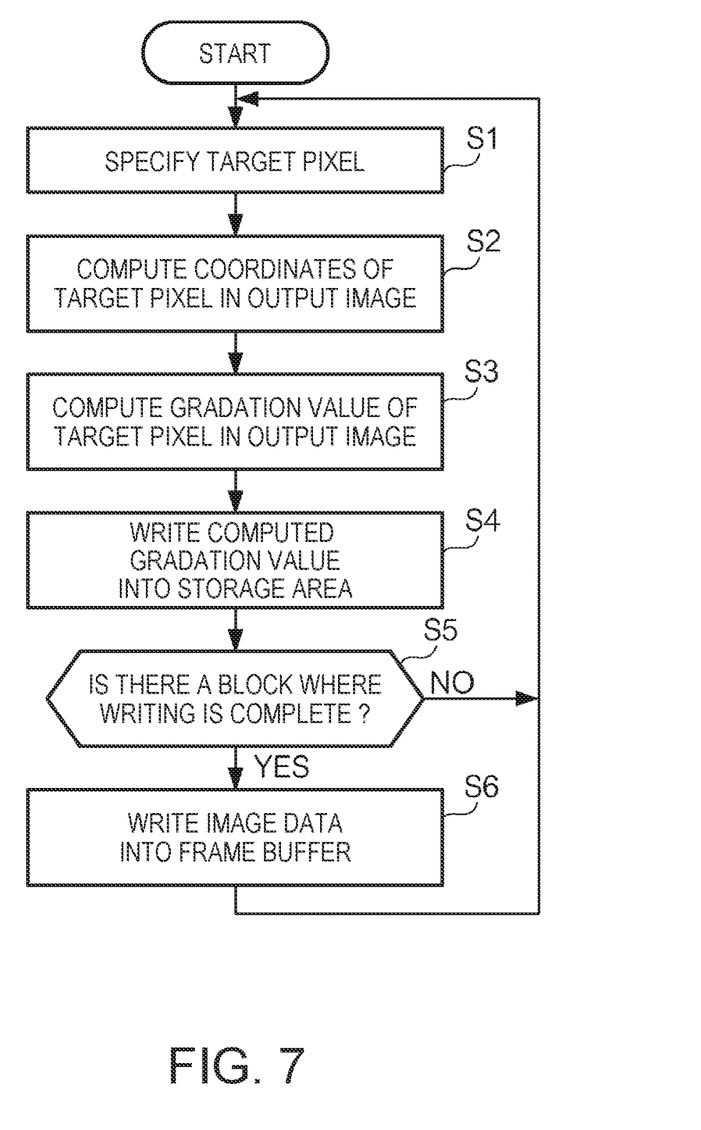
FIG. 7 is a flowchart showing the operation of the geometric correction circuit.

FIG. 7 is a flowchart showing the operation of the geometric correction circuit 1052. The following processing is started, prompted by switching on the power of the display device 1, and is carried out repeatedly while the display device 1 operates (that is, while a video signal is inputted to the display device 1). The writing of image data into the line buffer 1054 is carried out on a predetermined cycle, according to the specification of the target pixel in Step S1, described below. For example, if all of the pixels included in one line are specified as target pixels in Step S1, the image data of a line that is needed next is written into the line buffer 1054.

In Step 1, the geometric correction circuit 1052 specifies a target pixel. Specifically, the geometric correction circuit 1052 scans the image data of an input image in a predetermined direction and thus successively specifies target pixels.

In Step S2, the geometric correction circuit 1052 computes the coordinates of the target pixel in the output image. In the memory of the geometric correction circuit 1052, a coordinate conversion formula (function) for carrying out geometric correction is stored in advance. The parameter used in this function is calculated by the CPU 100 and written in the register of the geometric correction circuit 1052. The geometric correction circuit 1052 calculates, by using the function and the parameter, the coordinates in the output image, of each of the vertices of the target pixel (for example, four vertices of the target pixel), and determines whether the center point of one of the pixels in the output image is included in a geometrical figure having vertices at the calculated coordinates, or not. If it is determined that the center point of one of the pixels in the output image is included in the geometrical figure, the geometric correction circuit 1052 specifies the coordinates of this center point as the coordinates of the target pixel in the output image. Meanwhile, if it is determined that no center point of the pixels in the output image is included in the geometrical figure, the geometric correction circuit 1052 does not specify the coordinates of the target pixel in the output image. In this case, the geometric correction circuit 1052 repeats the processing of Step S1 and Step S2 and computes the coordinates of the next target pixel in the output image.

Figure 8:
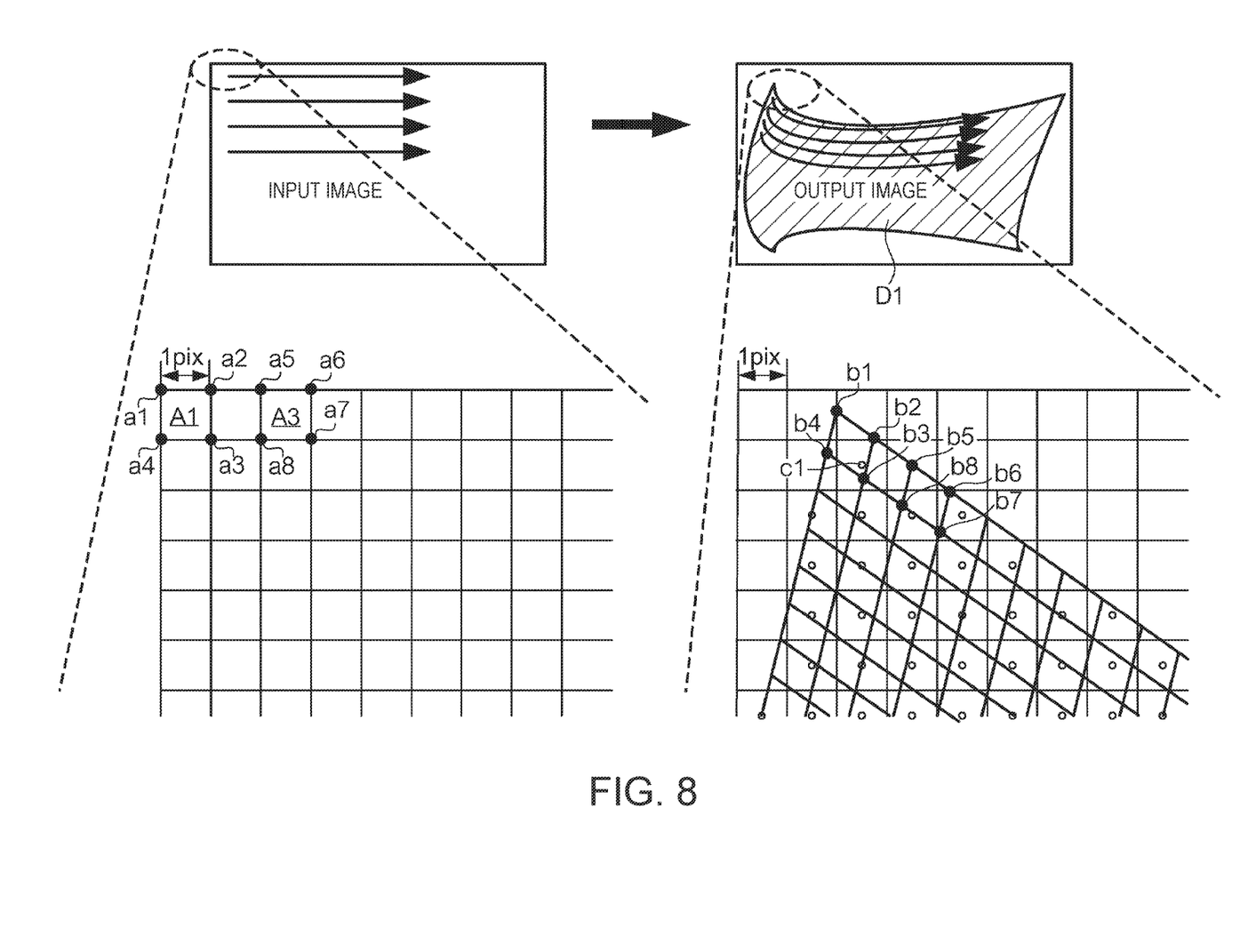
FIG. 8 is a specific example of the processing of computing coordinates.

FIG. 8 is a view showing a specific example of the processing of computing coordinates. FIG. 8 shows an enlarged state of a part of an input image and an output image. In FIG. 8, each of the areas partitioned in a lattice-like form is equivalent to one pixel of the input image and the output image. The white dots shown in the output image indicate the center points of the pixels forming the output image. In FIG. 8, the coordinates of the pixel in the i-th row and the j-th column are expressed as (j, i). In this example, the positions in the output image of vertices a1 to a4 of a pixel A1 included in the input image are points b1 to b4. A center point c1 of a pixel forming the output image is included in a quadrilateral having the points b1 to b4 as its vertices. Therefore, the geometric correction circuit 1052 calculates (3, 2) as the coordinates in the output image corresponding to the coordinates (1, 1) of the target pixel. Similarly, the geometric correction circuit 1052 calculates (4, 2) as the coordinates in the output image corresponding to the coordinates (2, 1) of the target pixel. In another example, the positions in the output image of vertices a5 to a8 of a pixel A3 included in the input image are points b5 to b8. No center point of a pixel forming the output image is included in a quadrilateral having the points b5 to b8 as its vertices. Therefore, the coordinates in the output image corresponding to the coordinates (3, 1) in the input image are not calculated. In this way, in Step S2, the coordinates in the output image of apart of the target pixels are computed and the coordinates in the output image of the remaining target pixels are not computed.

FIG. 7 is referred to again. In Step S3, the geometric correction circuit 1052 computes the gradation value of the target pixel in the output image. Specifically, the geometric correction circuit 1052 reads out the gradation values of the target pixel and the surrounding pixels of the target pixel from the line buffer 1054 and carries out convolution computation, thereby computing the gradation value at the coordinates computed in Step S2. The term "surrounding pixels" refer to, for example, pixels situated before and after the target pixel.

In Step S4, the geometric correction circuit 1052 writes the computed gradation value into a built-in buffer memory (not illustrated). This buffer memory is divided into a plurality of blocks. Each block has a storage area in the same size. The blocks are provided in a number corresponding to the size of the output image (in the scanning direction in the input image) and the size of each block. For example, if the size of the output image is 320 pixels horizontally by 240 pixels vertically and the size of each block is 32 pixels horizontally by 8 pixels vertically, the buffer memory has a storage area for 10 blocks. The geometric correction circuit 1052 writes the gradation value computed in Step S3 into the storage area corresponding to these coordinates, in the block corresponding to the coordinates computed in Step S2. As the gradation value in an area other than the area corresponding to the input image, in the output image (in the example of FIG. 4, an area other than the area D1), a fixed value (for example, if the gradation value is expressed in 256 stages from 0 to 255, "0" corresponding to black) is separately written into the buffer memory. This writing is carried out, for example, before the processing shown in FIG. 7 is started or in parallel with the processing shown FIG. 7. Also, this writing is carried out along the direction of rows in the output image, from the top left to the bottom right of the output image.

Although the implementation of this buffer memory may be any form, for example, the following may be employed. In addition to the storage area corresponding to the blocks, this buffer memory has a storage area at the stage preceding the block. The storage area at the preceding stage is divided into blocks as well. Here, for the sake of explanation, the block at the preceding stage and the block at the subsequent stage are referred to as the preceding block and the subsequent block, respectively. The preceding block has a storage area corresponding to the same pixel width as the subsequent block. The data of the input image is first written into the preceding block. When data for one row is fully provided in the preceding block, the data of that row is written into the block at the subsequent stage. The subsequent block has a flag indicating the writing of data is completed, for each row. When the data is written into the subsequent block from the preceding block, the flag for that row is rewritten (that is, set) to a value indicating the "completion of writing". Since the writing of data is carried out from the top left to the bottom right of the image, this flag is successively set, always from the top to the bottom. When set flags are fully provided corresponding to the height (number of rows) of the block, it can be seen that the writing of data into that block is completed.

Figure 9:
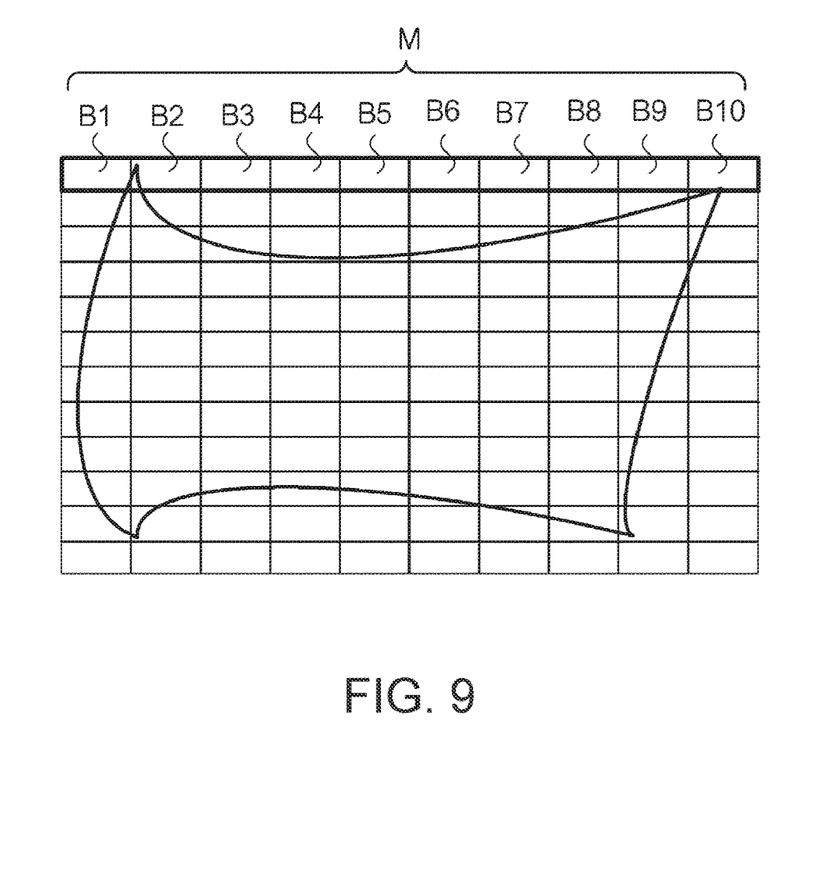
FIG. 9 is a schematic view of a buffer memory which stores gradation values of an output image.

FIG. 9 is a schematic view of a buffer memory M which stores the gradation value of an output image. In this example, the buffer memory M is formed by a storage area for 10 blocks (blocks B1 to B10) formed by dividing an output image in the direction of rows. A block B is formed in such a way that, in the area of the frame buffer 102B corresponding to this block B, the length in the direction in which the frame buffer 102B is scanned (hereinafter referred to as the "scanning direction") is longer than the length in the direction perpendicular to the scanning direction. Thus, the capacity of an internal buffer that is needed when the post-processing circuit 1053 reads out image data from the frame buffer 102B can be made smaller than in the case where the length in the scanning direction is equal to or shorter than the length in the direction perpendicular to the scanning direction. In FIG. 9, the size of the block B in the case where the frame buffer 102B is scanned in the direction of rows is shown, and the division is made in such a way that the length in the direction of rows is longer than the length in the direction of columns.

FIG. 7 is referred to again. In Step S5, the geometric correction circuit 1052 determines whether there is a block in which the writing of the gradation value is complete (that is, a block in which the gradation value of all of the pixels are written) or not. Specifically, the geometric correction circuit 1052 determines whether set flags are fully provided for the height of the block or not. For example, if the size of the block is 32 pixels horizontally by 8 pixels vertically, whether set flags are fully provided for 8 rows or not is determined. If it is determined that there is a block in which the writing of the gradation value is complete (YES in Step S5), the geometric correction circuit 1052 shifts the processing to Step S6. If it is determined that there is no block in which the writing of the gradation value is complete (NO in Step S5), the geometric correction circuit 1052 shifts the processing to Step S1.

In Step S6, the geometric correction circuit 1052 writes the image data of the block in which the writing of the gradation value is complete, into the frame buffer 102B. After finishing the writing into the frame buffer 102B, the geometric correction circuit 1052 resets the flag for the block in which the writing is complete, and allocates this block to an area where no block is allocated yet, in the output image. The allocation of the block is carried out in such a way that each block shifts in the direction of columns in the example shown in FIG. 9.

Figure 10:
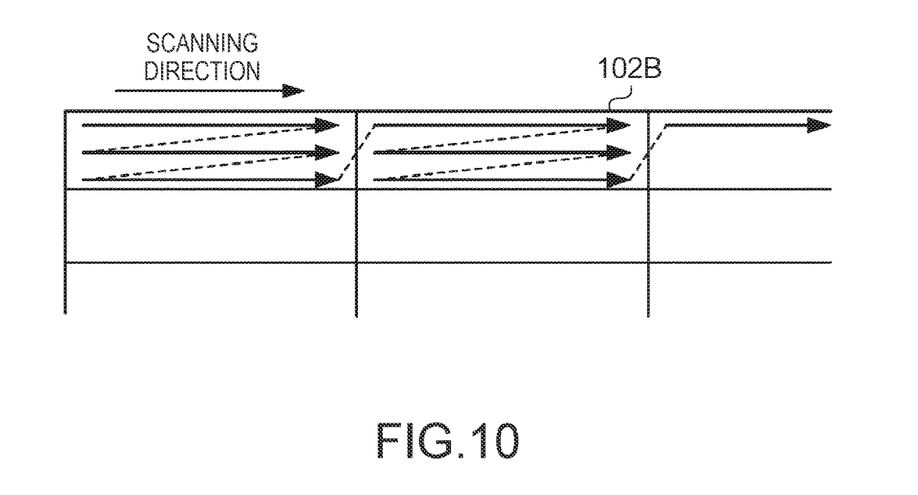
FIG. 10 is a schematic view of the configuration of a memory space in a frame buffer.

FIG. 10 is a view schematically showing the configuration of the memory space in the frame buffer 102B. In FIG. 10, each of the areas partitioned in a lattice-like form is equivalent to the area for one block. As shown in FIG. 10, the frame buffer 102B stores image data in such a way that the addresses in the area corresponding to the blocks in the geometric correction circuit 1052 become sequential. Thus, a reduction in the access efficiency when the geometric correction circuit 1052 writes image data, block by block, into the frame buffer 102B, is prevented. When the writing into the frame buffer 102B is started, the post-processing circuit 1053 scans the image data stored in the frame buffer 102B and thus reads out the image data, and outputs the image data to the projection unit 106.

Figure 11:
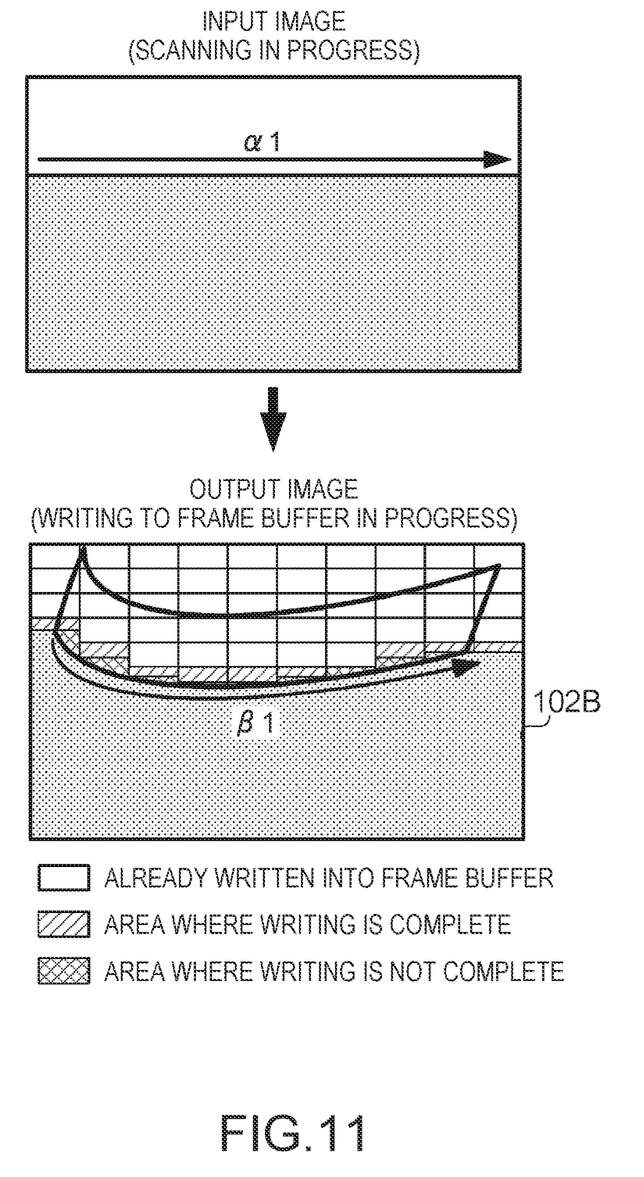
FIG. 11 is a view showing the way image data is written into the frame buffer.

FIG. 11 is a view showing the way the geometric correction circuit 1052 scans an input image and writes image data of an output image into the frame buffer 102B, block by block. In FIG. 11, as the input image is scanned in the direction of an arrow a1, the writing of data into the storage area in the geometric correction circuit 1052 is carried out in the direction of an arrow ($31. The area surrounded by a bold solid line represents an area corresponding to the input image. In the output image shown in FIG. 11, the area that is not shaded represents an area where the writing of image data to the frame buffer 102B is finished. The area shaded by slant lines is a part of the area where blocks are allocated and an area where the writing of the gradation value is complete. The hatched area is a part of the area where blocks are allocated and an area where the writing of the gradation value is not complete. As shown in FIG. 11, as the scanning of the input image progresses, the writing of image data into the frame buffer 102B is carried out and ultimately all of the image data of the output image is written into the frame buffer 102B.

By the foregoing processing, the image data of the input image is scanned in a predetermined direction and the writing of the image data to the frame buffer 102B is carried out block by block. Therefore, since the image data of the input image is not scanned in an unspecified direction, the geometric correction circuit 1052 can carryout geometric correction even if the frame buffer 102A is not provided at the stage preceding the geometric correction circuit 1052. Also, compared with the case where the image data of the input image is scanned in an unspecified direction, the access efficiency at the time of acquiring the image data of the input image is improved and the control circuit for acquiring the image data of the input image is prevented from becoming complex.

Figure 12:
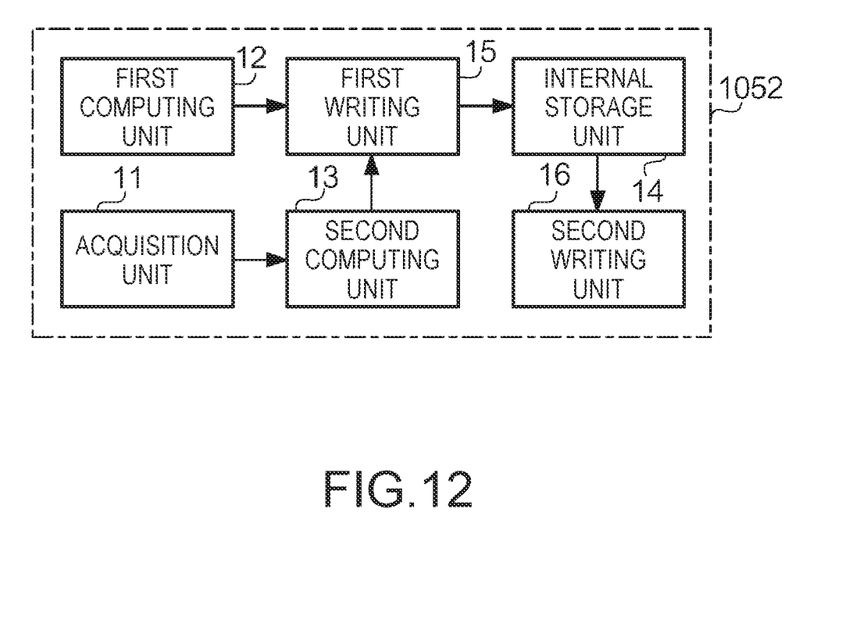
FIG. 12 is a block diagram showing a functional configuration of the geometric correction circuit.

FIG. 12 is a block diagram showing a functional configuration of the geometric correction circuit 1052. The geometric correction circuit 1052 has an acquisition unit 11, a first computing unit 12, a second computing unit 13, an internal storage unit 14, a first writing unit 15, and a second writing unit 16. The acquisition unit 11 successively acquires the gradation value of a target pixel specified in a predetermined order, from image data of an input image including the gradation values of a plurality of pixels. The first computing unit 12 computes the coordinates of the target pixel in an output image. The second computing unit 13 computes the gradation value at the coordinates computed by the first computing unit 12, based on the gradation value of the target pixel. The internal storage unit 14 has a storage area which stores the gradation values of the plurality of pixels, block by block, each block being formed by dividing a plurality of pixels included in the output image. The first writing unit 15 writes the gradation value computed by the second computing unit 13 into a storage area corresponding to the coordinates computed by the first computing unit 12, in the internal storage unit 14. The second writing unit 16 writes data of a block where the writing of the gradation value is complete in the internal storage unit 14, into an external memory.

In the hardware configuration of the geometric correction circuit 1052 shown in FIG. 6, the line buffer 1054 is an example of the acquisition unit 11. The coordinate computing unit 1055 is an example of the first computing unit 12. The filter computing unit 1056 is an example of the second computing unit 13. The block generation unit 1057 is an example of the internal storage unit 14, the first writing unit 15, and the second writing unit 16.

3. Modifications

The invention is not limited to the foregoing embodiment and can be carried out with various modifications. Several modifications are described below. Two or more of the following modifications may be used in combination.

The processing carried out by the geometric correction circuit 1052 is not limited to the processing described in the embodiment. For example, the geometric correction circuit 1052 may compress image data of a block where the writing of the gradation value is complete, and write the compressed image data into the frame buffer 102B. In this case, the post-processing circuit 53 decompresses the image data when reading out the image data from the frame buffer 102B. Also, in this case, the geometric correction circuit 1052 may change the number of pixels per block in the storage area, according to the compression rate of the image data. Specifically, the geometric correction circuit 1052 may control the storage area in such a way that the number of pixels per block increases as the compression rate of the image data rises. Thus, as the compression rate of the image data rises, the data volume per block written into the frame buffer 102B is prevented from decreasing and a reduction in the access efficiency when the geometric correction circuit 1052 writes image data into the frame buffer 102B is prevented.

The shape of the blocks and the number of the blocks are not limited to those described in the embodiment. For example, the storage area in the geometric correction circuit 1052 may be formed by more than 10 blocks.

The frame buffer 102A may be provided at the stage preceding the geometric correction circuit 1052. For example, in the case where the magnification of the image is changed in the image processing circuit 105, the degree of freedom in setting the magnification can be improved by providing the frame buffer 102A at the stage preceding the geometric correction circuit 1052. Meanwhile, in view of avoiding a frame delay and reducing the memory band, the frame buffer 102A may be absent.

The hardware configuration of the display device 1 is not limited to that illustrated in FIG. 1. For example, the projection unit 106 need not necessarily have a light modulator for each color component and may have a single light modulator. Also, an electro-optical element other than a liquid crystal panel, such as a digital mirror device (DMD), may be used as a light modulator. Moreover, the display device 1 is not limited to a projector and may be a direct-view display device such as a liquid crystal display or organic EL display. For example, in a display device which modifies an input image into an output image in an arbitrary shape and thus displays the output image, the processing described in the embodiment may be carried out.

What is claimed is:

1. An image processing device comprising:
an acquisition unit which successively acquires a gradation value of a target pixel specified in a predetermined order, from image data of an input image including gradation values of a plurality of pixels;
a first computing unit which computes coordinates of the target pixel in an output image;
a second computing unit which computes a gradation value at the coordinates computed by the first computing unit, based on the gradation value of the target pixel;
an internal storage unit having a storage area where, block by block, each block being formed by dividing a plurality of pixels included in the output image, gradation values of the plurality of pixels are stored;
a first writing unit which writes the gradation value computed by the second computing unit into a storage area corresponding to the coordinates computed by the first computing unit, in the internal storage unit; and
a second writing unit which writes data of a block where the writing of the gradation value is complete in the internal storage unit, into an external memory, wherein
a length in a direction in which the external memory is scanned, of an area corresponding to the block in the external memory, is longer than a length in a direction perpendicular to that direction.

2. The image processing device according to claim 1, wherein a frame buffer is not provided at a stage preceding the acquisition unit.

3. A display device comprising:

the image processing device according to claim 1.

4. An image processing device comprising:

an acquisition unit which successively acquires a gradation value of a target pixel specified in a predetermined order, from image data of an input image including gradation values of a plurality of pixels;

a first computing unit which computes coordinates of the target pixel in an output image;

a second computing unit which computes a gradation value at the coordinates computed by the first computing unit, based on the gradation value of the target pixel;

an internal storage unit having a storage area where, block by block, each block being formed by dividing a plurality of pixels included in the output image, gradation values of the plurality of pixels are stored;

a first writing unit which writes the gradation value computed by the second computing unit into a storage area corresponding to the coordinates computed by the first computing unit, in the internal storage unit; and a second writing unit which writes data of a block where the writing of the gradation value is complete in the internal storage unit, into an external memory, wherein the second writing unit writes the data in a compressed form into the external memory, and the internal storage unit controls the storage area in such a way that the number of pixels per block increases if a compression rate of the data rises.

* * * * *